US006389700B2

(12) United States Patent
Paquin

(10) Patent No.: US 6,389,700 B2
(45) Date of Patent: May 21, 2002

(54) CHAINSAW BAR GUARD

(76) Inventor: Joseph Gerald Ronald Paquin, 449 Dogwood Street, Campbell River, B.C. (CA), V9W 2Y2

( * ) Notice: Subject to any disclaimer, the term of this patent is extended or adjusted under 35 U.S.C. 154(b) by 0 days.

(21) Appl. No.: 09/771,668

(22) Filed: Jan. 30, 2001

(30) Foreign Application Priority Data

Apr. 3, 2000 (CA) ........................................ 2303675

(51) Int. Cl.[7] ........................................ B23D 57/02
(52) U.S. Cl. ........................................ 30/382; 30/386
(58) Field of Search ........................ 30/382, 383, 386, 30/151, 286

(56) References Cited

U.S. PATENT DOCUMENTS

| | | | | |
|---|---|---|---|---|
| 2,638,944 A | | 5/1953 | Woleslagle | |
| 2,937,673 A | * | 5/1960 | Duperron et al. | 30/382 X |
| 3,042,087 A | | 7/1962 | Otoupalik | |
| 3,808,684 A | * | 5/1974 | Ludwig | 30/382 |
| 3,866,320 A | * | 2/1975 | Progl | 30/386 |
| 4,193,193 A | | 3/1980 | Holzworth | |
| 4,257,162 A | * | 3/1981 | Pardon | 30/382 X |
| 4,369,575 A | | 1/1983 | Schurman | |
| 4,447,953 A | | 5/1984 | Lombardino | |
| 4,597,178 A | | 7/1986 | Dolata | |
| 4,621,426 A | | 11/1986 | Shivers | |
| 4,625,783 A | | 12/1986 | Notaras | |
| 4,939,842 A | * | 7/1990 | Rebhan | 30/386 |
| 5,119,937 A | | 6/1992 | Reynolds, Jr. | |
| 5,156,156 A | | 10/1992 | Ruzich | |
| 5,213,207 A | | 5/1993 | Konev | |
| D359,849 S | | 7/1995 | Griffin | |

* cited by examiner

*Primary Examiner*—Douglas D. Watts
(74) *Attorney, Agent, or Firm*—Robert H. Barrigar

(57) ABSTRACT

An easily engageable and releasable chainsaw bar guard for protecting an individual carrying a chainsaw and for preventing damage to the cutter chain and saw dogs of a chainsaw. The bar guard comprises an elongated stiff hollow sleeve whose interior space is just slightly larger than the bar and chain to be protected. The sleeve has an opening at the proximal end for sliding the sleeve onto the guide bar, and is closed at the other end to protect the end of the bar and cutter chain. A snap-clip mechanism is fixed to the sleeve for releasably latching the proximal end of the guard to the chainsaw. The snap-clip mechanism biases a retaining claw into contact with the chainsaw bar between the nuts on the saw bar attachment/adjustment bolts. The sleeve and the snap-clip mechanism can be selectively configured to accommodate chainsaw bars of different shapes and dimensions and the spacing of whose guide bar adjustment nuts varies. The guard may optionally be provided with clips, pockets or containers for storing chainsaw tools.

14 Claims, 4 Drawing Sheets

CHAINSAW BAR GUARD

BACKGROUND OF THE INVENTION

1. Field of the Invention

This invention relates to a protective guard for conventional portable chainsaws, including those with saw dogs. This invention is suitable for use when a chainsaw is carried, transported, or stored, thereby reducing the possibility of injury to the individual carrying or handling the chainsaw, and also reducing the possibility of damaging the cutter chain or saw dogs of the chainsaw during such activities.

2. Description of the Prior Art

Because of the sharp edges of cutter chains and also of saw dogs when present on conventional chainsaws, chainsaws may cause injuries to the individuals carrying or handling the chainsaws, and their sharp edges may be damaged by unintended contact with objects.

One way previously proposed to minimize the risk of such injuries and damage was to place a chainsaw in a sealed portable case or similar container. However, the substantial weight and volume of such cases rendered them unattractive to individuals using them, especially loggers, who frequently have to carry chainsaws on foot to working sites. Exemplary such cases are described in Schurman U.S. Pat. No. 4,369,575 granted Jan. 25, 1983, Reynolds U.S. Pat. No. 5,119,937 granted Jun. 9, 1992, and Griffin U.S. Design Pat. No. 359,849 granted Jul. 4, 1995.

Another way previously proposed to prevent such injuries was to provide a guard, sheath, or the like to limit access to the cutter chain. However, in many such proposed devices, the protection of the individual primarily sought was protection during the sawing operation, not primarily protection during carrying or transporting the chainsaws. For example, many bar guards, sheaths, or the like were designed to prevent kickback when operating the chainsaw. Therefore, a portion of the cutter chain was always exposed when using such devices; the possibility of damage or injury during transportation was not prevented. An exemplary such partially open guard is illustrated in Holzworth U.S. Pat. No. 4,193,193 granted Mar. 18, 1980. A similar such guard hingedly connected to the saw is described in Shivers U.S. Pat. No. 4,621,426 granted Nov. 11, 1986. The Shivers bar guard is expensive and awkward to use; it remains attached to the saw during the sawing operation while it is pivoted upwards away from the guard, interfering with the operator's view of the log or other workpiece.

Other such protective devices often required some modification of the chainsaw itself. By way of example, in Otoupalik U.S. Pat. No. 3,042,087 granted Jul. 3, 1962, a protective sheath was designed to be removably attached to the chainsaw by a pair of removable tension springs. The cutter chain was completely sealed when the sheath was attached. However, the primary objective of the above mentioned invention was to protect the cutter chain and guide bar from damage during transportation of the chainsaw. As a result, the combined chainsaw and guard remained hazardous to the person carrying the chainsaw with the sheath thereon. For example, since the tension springs were hooked onto the chainsaw handle bar, the springs often interfered with carrying the chainsaw. Further, when the sheath was attached, the tension springs were always in extension. Thus, it was quite possible that the person carrying the chainsaw with the sheath thereon might be injured by the tension spring if it were accidentally dislodged. Finally, the sheath was not intended to cover saw dogs, and in fact, the tension springs extended in the vicinity of the saw dogs when they were attached to the handle bars. Therefore, simply by using the prior Otoupalik device, the risk of at least some types of injury increased.

An expensive and complex solution to the chainsaw guard protection problem is illustrated in Woleslagle U.S. Pat. No. 2,683,944 granted May 19, 1953. The telescoping sheath described by Woleslagle is awkward to use and necessarily bulky at one end to accommodate the series of telescoping elements when they are collapsed.

SUMMARY OF THE INVENTION

The present invention is a detachable bar guard that is inexpensive to manufacture, easy to attach to and detach from the chainsaw, secure when in place on the chainsaw bar, fully protective of both the cutter chain and the individual carrying the saw, including protection for and from saw dogs when present, lightweight and unobstructive.

A preferred embodiment of the invention comprises an elongate sleeve or sheath that shields substantially all normally exposed portions of the cutter chain on the guard bar, and also may be configured to provide the same shielding to saw dogs if present. Optionally, the flat of the sleeve may be provided with open areas to reduce weight. The proximal end of the sleeve is provided with a snap-clip mechanism to attach the sleeve to the chainsaw.

The inventor recognized that most chainsaws are designed to mount the bar to the saw housing or frame by means of a pair of spaced attachment/adjustment bolts that engage mating slots in the bar; as the chain wears and becomes looser, the nuts on the bolts are loosened and the bar is then moved distally relative to the driving sprocket of the chainsaw so as to tighten the chain on the bar. These adjustment nuts are invariably or almost invariably exposed to easy access to facilitate bar position adjustment. Further, although not quite uniformly placed or spaced from one saw design to another, the nuts are placed and spaced quite similarly from one chainsaw to another.

Accordingly, it is possible to provide a snap-clip mechanism on a sleeve according to the invention that mates with the retainer space between sequential adjustment nuts and that may be adjustable or adaptable to suit a range of chainsaws. The snap-clip mechanism includes a retaining claw that is biased into contact with the chainsaw frame or bar mounting plate or the like in the retainer space between the two bar guide adjustment nuts. The claw may be an elastic element fixed to or integral with the sleeve and configured so that under the biasing force, the claw is normally retained in place between the adjustment nuts. Alternatively, the claw may be rigid but pivotally mounted on the sleeve for biased engagement; a suitable biasing means such as a coil spring provides the bias force.

The claw/clip dimensions and configuration may be varied and selected to permit some longitudinal adaptability of the snap-clip mechanism to fit different chainsaws. Alternatively, the claw may be slidably mounted to the sleeve so that by sliding the claw into different mounting positions, it may fit different chainsaws. The sleeve may be oversized to fit both those bars in which there is little clearance between the chain and the interior walls of the sleeve and also smaller bars, or instead the sleeve may be made in a variety of sizes to fit bars of various standard lengths, or both.

Many types of plastics material are suitable for manufacture of the sleeve; such materials are sufficiently rigid to provide good protection for the chain and saw dogs when manufactured with relatively thin, lightweight walls, sufficiently soft not to damage the saw teeth if impacting against the teeth, and sufficiently flexible that a claw formed integrally with the sleeve is easily deflected to permit engagement and disengagement of the claw with the retainer space between the adjustment nuts. A somewhat less expensive and generally satisfactory manufacture of the guard can be effected using sheet steel for the sleeve and welding the snap-fit mechanism thereto; this solution entails some slight risk of dulling saw teeth if and when they come into frictional or impact contact with the guard, but the risk is probably acceptable because the saw teeth become dull with use in any case.

A sleeve-and-claw arrangement of the foregoing sort constitutes a secure bar guard protecting both the sawbar and the user that is easily secured to and released from the chainsaw, is lightweight, comfortable to someone carrying the chainsaw on the shoulder or otherwise, and inexpensive to manufacture. A claw arrangement of the foregoing sort constitutes an easily engageable and releasable means for attaching the bar guard to a chainsaw. Note that the snap-clip mechanism can be configured and positioned so that it does not significantly interfere with the carrying of the chainsaw. The snap-clip mechanism can be selectively configured to accommodate chainsaws of different manufacturers whose guide bar adjustment nuts are spaced differently from the proximal end of the guide bar and from one another.

While the foregoing is the preferred embodiment, it can readily be recognized that modifications and variants are possible within the foregoing inventive concept. For example, the sleeve could be made as a telescoping sleeve made of, say, three mutually slidable and overlapping elements so that a single guard could fit bars of several different standard lengths. That alternative would undesirably add to the weight, manufacturing cost, complexity (which would probably have a deleterious effect on the mechanical reliability of the sleeve) and bulk of the guard. Or the sleeve could be provided with a notch engageable by a claw mounted on one or both of the adjustment nuts. That alternative is considered undesirable because it could lead to premature loosening of one or both nuts and would interfere with the bar adjustment process. Further alternatives within the general scope of the invention will occur to those skilled in the design of equipment of this sort.

The guard may optionally be provided with clips, pockets or containers for storing chainsaw tools. Such auxiliary elements, if provided, should preferably be located at the distal end of the guard so that they do not interfere with carrying the chainsaw (with guard attached) on the shoulder.

DESCRIPTION OF PREFERRED EMBODIMENTS

Figure 1A:
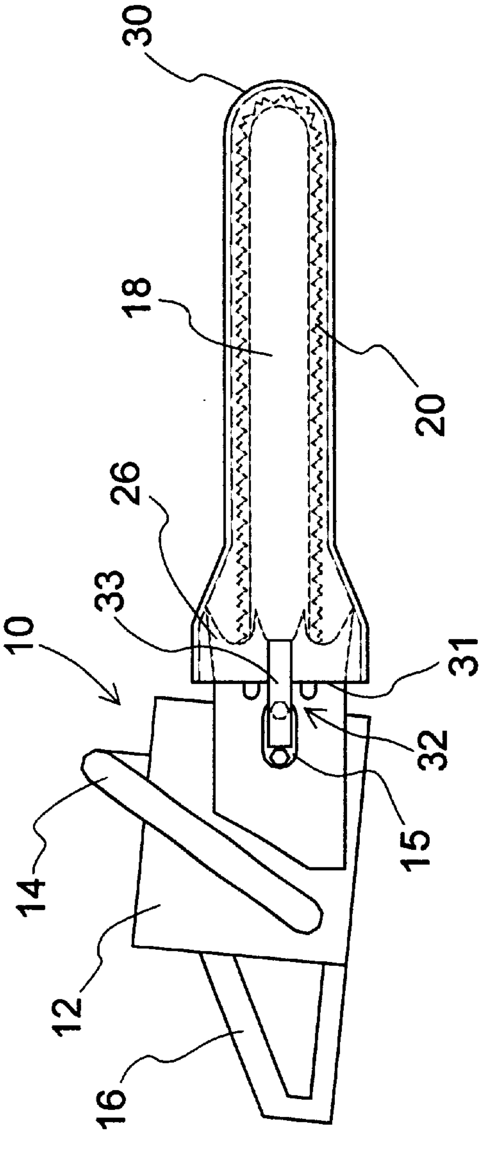
FIG. 1A is a schematic side elevation view of a conventional chainsaw having a bar guard structured in accordance with one embodiment of the present invention.

Referring to FIGS. 1A, 1B, 2A and 2B, a conventional power chainsaw 10 is disclosed having a motor housing 12, support handles 14 and 16, a forwardly projecting guide bar 18 around the slotted perimeter of which is slidably mounted an endless cutter chain 20, two guide bar adjustment nuts 22, 24, and two saw dogs 26, 28 on either side of the guide bar 18. The cutter chain is driven by a drive sprocket (not illustrated) within the housing 12. The adjustment nuts 22, 24 mate with corresponding attachment/adjustment bolts (not specifically illustrated) that pass through cut-out slots in the guide bar 18 and pass through a chainsaw bar mounting plate or mounting frame element 15 attached to the housing 12 or attached to a frame portion of the chainsaw 10 not specifically illustrated, or constituting a part of such housing or frame, whereby the guide bar 18 is secured to the chainsaw frame or to the housing 12 and may be adjustably positioned relative thereto by loosening the nuts 22, 24 and repositioning the bar, which is slidable within limits relative to the bar mounting frame or plate 15 within the limits of the cut-out slots of the bar 18. All of the foregoing elements of the chainsaw are conventional and their interrelationship is conventional. Since there is some variability in conventional chainsaw design, reference herein to, for example, a guide bar mounting frame 15 should be taken as embracing mechanical equivalents such as a plate or frame extension or housing extension or the like through which the guide bar mounting bolts pass.

The preferred embodiments of the bar guard, disclosed in FIGS. 1A through 2B, each include an elongate sleeve 30 to the proximal end of which is fixed a snap-clip mechanism 32 for attaching the sleeve 30 to the chainsaw 10. The snap-clip mechanism 32 is permanently attached to the sleeve 30. Depending upon choice of materials, the mechanism 32 or at least its base can be manufactured integrally with the sleeve 30 or may be welded or otherwise bonded thereto.

The sleeve 30 is configured to envelope the cutter chain 20 and is provided with a proximal opening 31 to permit the sleeve 30 to cover the cutter chain 20. The sleeve 30 has about the same contour or shape as, but is slightly larger than, the guide bar 18 with the cutter chain 20 thereon, so that when the sleeve 30 is placed on the chainsaw, the entire length of the cutter chain 20 will be concealed and protected. Further, in order for the sleeve 30 to cover the saw dogs 26 and 28, the sleeve 30 flares outwardly in the vicinity of the proximal opening 31 in the plane of the guide bar 18 so as to be wide enough in that portion to cover the saw dogs 26, 28.

Variations are possible in the construction of the sleeve 30, which may be made of any strong, lightweight, durable material such as metal or plastic. Although it is possible to have a telescoping sleeve arrangement (not shown) that would enable a single manufactured sleeve of variable length to be used to cover and protect guide bars of different lengths, there are disadvantages in such an arrangement. First, a telescoping arrangement would give rise to a significant manufacturing cost. Second, its relative complexity and the existence of moving parts would present a risk of malfunction or damage to the bar guard. Finally, a telescoping sleeve arrangement would weigh more than a counterpart sleeve of fixed length, and would be oversized for chainsaws with shorter guide bars, in part because as guide bars become shorter, they also tend to become narrower. Thus, in the preferred embodiments of this invention, the length of the sleeve 30 would be fixed. A number of sleeves of different dimensions would be manufactured so that the manufactured set of bar guards would suit most popular models of chainsaws of given guide bar length.

Further, it is possible to design a sleeve 30 that does not conceal the entire exposed length of the guide bar 18; a plurality of openings may be provided on the portion that covers the flat of the guide bar 18 (but not the chain 20) in order fully to protect the chain 20 while saving weight. However, the plurality of openings may serve to catch various foreign objects such as twigs, branches, or debris, and thereby create a hazard for the individual carrying a chainsaw with such partly open bar guard.

The preferred embodiment of the snap-clip mechanism 32 (see FIGS. 2A, 2B, 3A and 3B) includes a mounting bracket 34 fixed to the sleeve 30 and a clip arm 36 pivotally mounted on the mounting bracket 34. The clip arm 36 is integral with or fixed to a retaining claw 50 whose distal portion enters retainer space 17 between guide bar adjustment nuts 22, 24 and whose latch face 52 engages the distal nut 24. Note that the retainer space 17 between the retainer nuts 22, 24 is inherent in conventional chainsaw design. Accordingly, a biased engagement of latch face 52 with the distal nut 24 bordering the retainer space 17 secures the sleeve 30 to the chainsaw 10. The biasing means is described further below.

The clip arm 36 is pivotally mounted on the mounting bracket 34 by a removable pin or screw 38. Other clip arms 36 having various lengths of extension can then be substituted for that for the time being mounted on bracket 34, each in selected sequence being pivotally mounted on the mounting bracket 34, as disclosed in FIGS. 3A and 3B. Clip arms 36 each have a substantially identical claw 50 at the working end thereof, but if, say, longer clip arms 36 are typically needed for use with guide bars mounted by more widely spaced adjustment bolts and nuts 22, 24, the claw 50 may be dimensioned and shaped accordingly. The design in each case is selected so that the retaining claw 50 can engage the retainer space 17 between the two guide bar adjustment nuts 22 and 24; the distal nut 24 acts as a stop against which latch edge 52 of the claw 50 bears to prevent the sleeve 30 from sliding distally off the guide bar 18. Suitable shaping and dimensioning of the clip arm 36 and associated claw 50 may be selected for a family of such elements, thereby accommodating chainsaws of different manufacturers whose guide bar adjustment nuts 22 and 24 are spaced differently from the proximal end of the guide bar 18 and possibly also from one another.

Figure 3A:
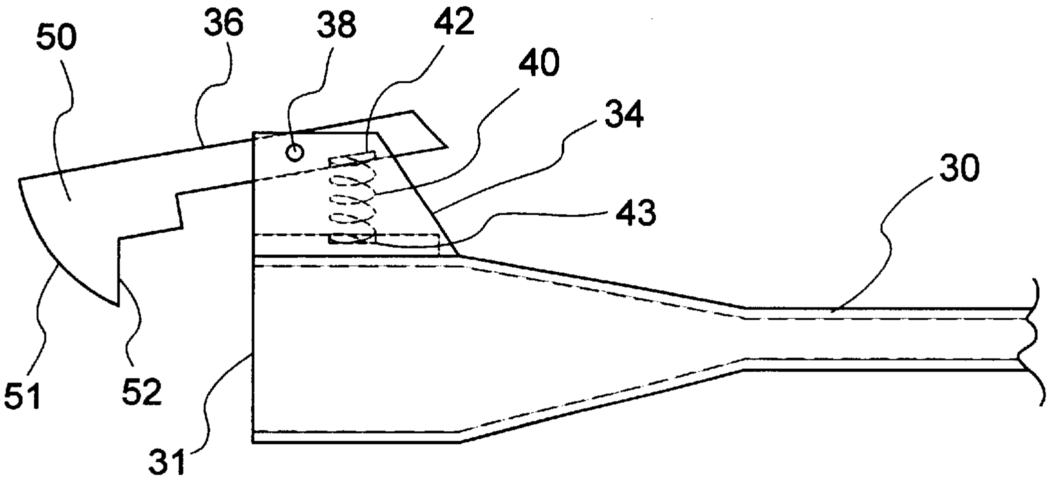
FIG. 3A is a schematic bottom fragment detail view of a preferred embodiment of a snap-clip mechanism of the type appearing in FIGS. 2A and 2B mounted on the bar guard of FIGS. 2A and 2B.
Figure 3B:
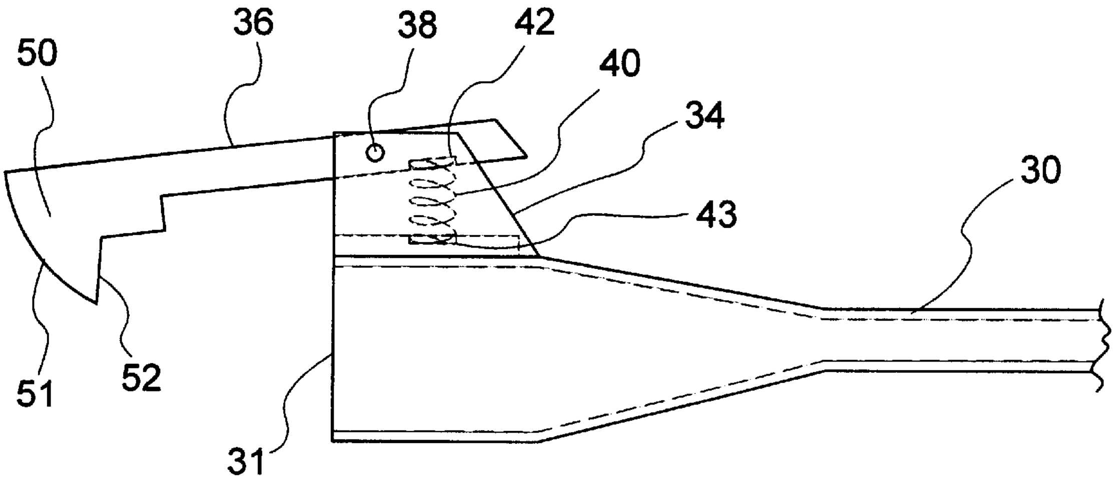
FIG. 3B is a schematic bottom fragment detail view of a preferred embodiment of a snap-clip mechanism of the type appearing in FIGS. 2A and 2B mounted on the bar guard of FIGS. 2A and 2B, differing from FIG. 3A in that the claw arm is of a length different from that of FIG. 3A.

In the preferred embodiment of the snap-clip mechanism 32 disclosed in FIGS. 3A and 3B, a small coil compression spring 40 is removably mounted between the mounting bracket 34 and the clip arm 36 to bias the retaining claw 50 into the retainer space 17; it is of course necessary for this purpose that the compression spring 40 be located on the side of pivot pin 38 remote from the claw 50 if the spring is to exert the requisite bias. The spring 40 is removable to facilitate replacement of the clip 36. Circular recessed seats 42 and 43 are respectively provided on the underside of the clip arm 36 and on the base of the mounting bracket 34 as spring mounting means for mounting the coil compression spring 40.

Variations of possible mounting means are possible, such as circular stud seats, or hooks. However, a recessed circular seat is preferable because it is cost-effective and facilitates easy re-installation of the spring 40 after replacement of a clip arm 36. (Note that instead of a compression coil spring as described, a coil spring under tension could conceivably be connected between the near underside of the claw 50 and the neighbouring area of the base of the bracket 34, but such arrangement would render replacement of the clip arm 36 more difficult, partly because of the need to provide a different attachment arrangement for the ends of such coil spring.)

Referring again to FIGS. 3A and 3B, the retaining claw 50 has a terminating convex surface 51 and a plane latch surface 52. The convex surface 51 facilitates overcoming the resistance offered by the distal adjustment nut 24 to sliding the retaining claw 50 inwardly thereover. Once the retaining claw 50 is engaged within the retainer space 17 between the two bar guard adjustment nuts 22 and 24, the bias force provided by the clip mechanism 32 resists dislodgement of the claw 50 and thereby retains the sleeve 30 in place.

Figure 1B:
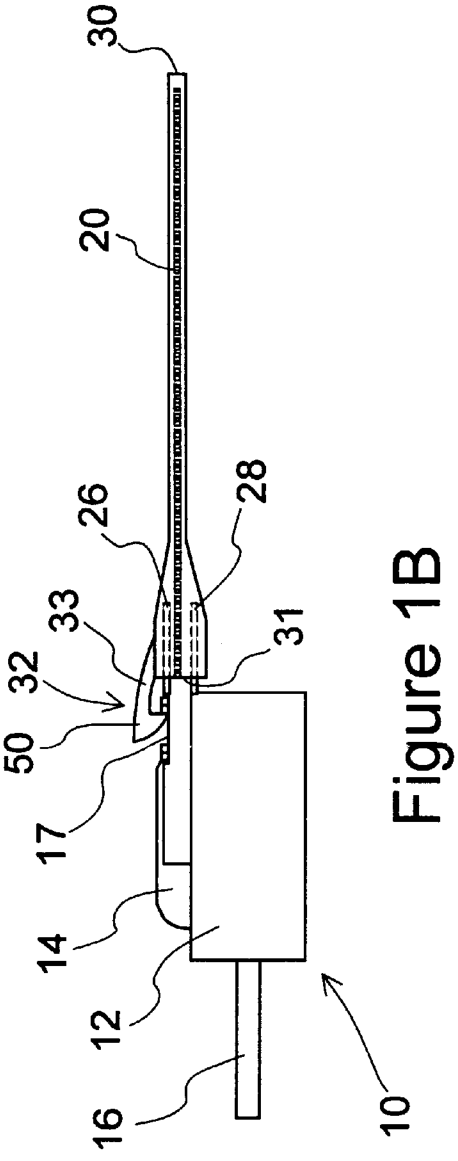
FIG. 1B is a schematic bottom view of the chainsaw and guard of FIG. 1A.
Figure 2A:
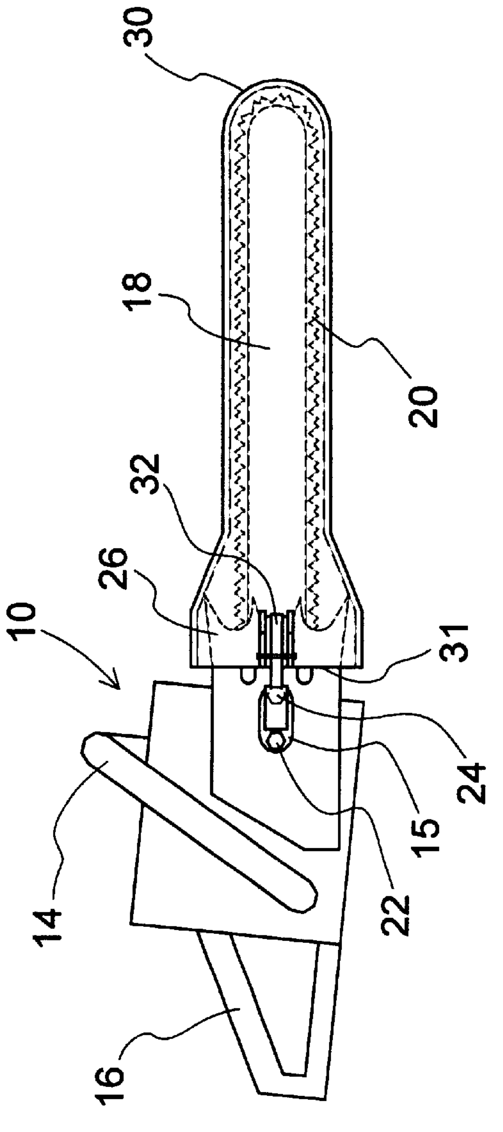
FIG. 2A is a schematic side elevation view of a conventional chain saw having a guide-bar guard structured in accordance with a preferred alternative embodiment of the present invention.
Figure 2B:
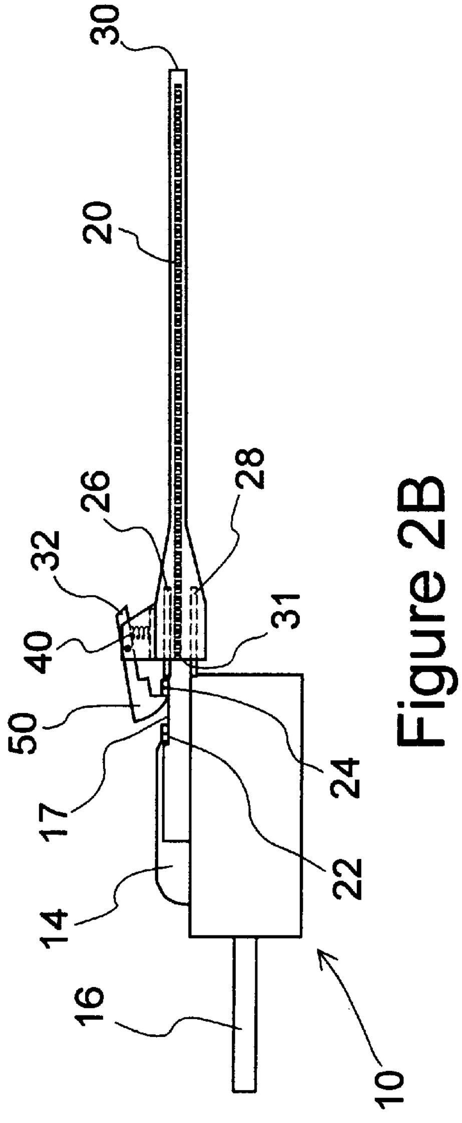
FIG. 2B is a schematic bottom view of the chainsaw and guard of FIG. 2A.

An alternative less preferred embodiment of the snap-clip mechanism 32 is disclosed in FIG. 1B. In this preferred embodiment, the snap-clip mechanism 32 comprises a single elongate clip element 33 having the associated claw 50 formed integrally therewith, and with no separate mounting means. Instead, the clip 33 is permanently attached, preferably bonded or welded, depending upon choice of materials, to the sleeve 30. Or the clip 33 may be formed integrally with the sleeve 30. The biasing force for the clip 33 is provided by the inherent elasticity of the material of which the clip 33 is made; the clip 33 may bend and deflect to permit the claw 50 to slide over the distal nut 24. In this embodiment, in order to accommodate chainsaws of different manufacturers whose guide bar adjustment nuts 22 and 24 are spaced differently from the proximal end of the guide bar 18, the clip 33 can be pre-manufactured in a variety of lengths before being fixed to the sleeve 30. Alternatively, this objective can be accomplished by giving the clip 33 a pronounced arcuate or bow profile (not shown; the bow profile in FIG. 1 is more gently arcuate). The pronounced bow profile permits the clip to flatten and extend so that its integral claw can reach a given retainer space 17 that is more remote than a space reachable by the claw when the bow is, in its rest position, most pronounced, in which position the overall length of the clip is of course at a rest minimum. Note that this "pronounced bow" solution to the adjustment problem requires that the central part of the clip protrude appreciably outwardly away from the guide bar 18 when the clip is in rest position; such design entails the risk of snagging the clip and is for that reason not preferred. Also, to afford ready flexibility of the clip, the clip may be made of material that is thinner than otherwise would be desired.

Another possible solution (not shown) is to provide an elongate clip with an extended interconnection tail provided with a serious of spaced apertures. The clip could be slidably mounted in a mating bracket or recess on the sleeve; the bracket or recess could have a number of apertures mating with those of the clip tail through which fastening bolts or the like could pass, thereby permitting the distance from the retaining claw to the sleeve opening to be varied.

Figure 4:
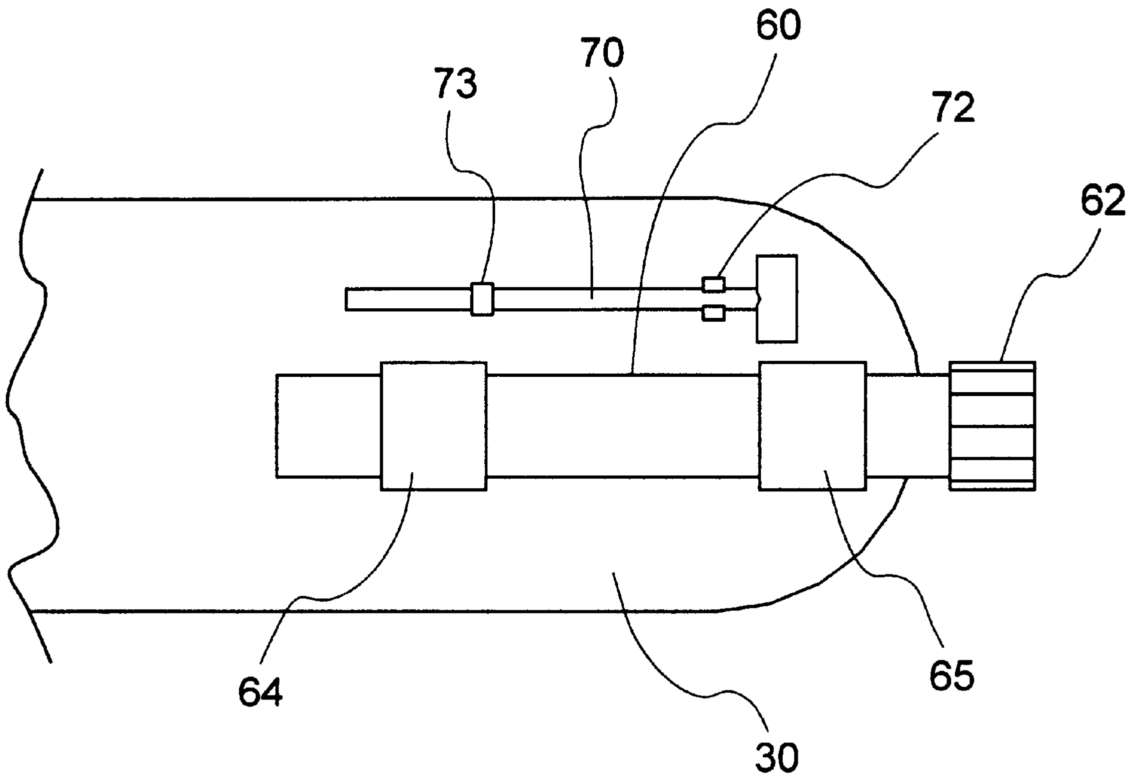
FIG. 4 is a schematic side elevation fragment view of a distal portion of a variant according to the invention of the bar guard of any of the preceding views showing auxiliary snap fastenings and chainsaw-servicing tool container mounted thereon.

The flat surface of the sleeve 30 may also be provided with containers, clips or other holding means for holding tools necessary for servicing chainsaw in the field. Preferably any such containers or the like should be located at the distal end of the sleeve 30 so that when the chainsaw is carried on one's shoulder, the containers, etc. do not make contact with the shoulder. In FIG. 4, by way of example, a tubular container 60 with a removable threaded cap 62 for holding chainsaw files (not shown) is attached to the distal portion of the sleeve 30 by a pair of straps 64 and 65. The tubular container 60 could instead be attached to the sleeve 30 by a pair of snap fastenings fixed to the sleeve 30, or may be molded into the sleeve 30 itself. In any of the mentioned embodiments, it is preferable that the tubular container 60 be held in such position that threaded cap 62 extends distally beyond the distal end of the sleeve 30 so that the cap 62 can be easily removed or replaced.

By way of further exemplification, a sparkplug tool 70 is shown removably attached to the sleeve 30 by a snap bracket 72 and an eye 73 fixed to said elongated sleeve 30.

Further variants and modifications of the bar guard according to the invention will occur to those skilled in the design of such items. The scope of the invention is as defined in the appended claims. For simplicity of exposition, reference in the claims to mounting the guide bar on a "guide bar mounting frame" includes the possibility of mounting the guide bar on the motor housing or other suitable component of the chainsaw.

What is claimed is:

1. A bar guard for a chainsaw having a guide bar mounting frame, a guide bar detachably and adjustably mounted on the frame, a cutter chain slidably mounted on the guide bar, and two guide bar adjustment bolts and corresponding adjustment nuts for detachably mounting the guide bar to the frame and for adjusting the longitudinal position of the guide bar relative to the frame so as to adjust the clearance of the cutter chain relative to the guide bar, the adjustment nuts spaced from one another and forming a retainer space therebetween, the bar guard comprising:

(i) an elongate sleeve for substantially enveloping the distal portion of the cutter chain supported on the guide bar, the sleeve having a proximal opening to permit the sleeve to pass over the bar and chain, and (ii) a snap-clip mechanism fixed to the sleeve in the vicinity of the proximal end of the sleeve, the snap-clip mechanism including a retaining claw for entering the retainer space between the adjustment nuts and establishing a releasable latch connection with the distal said adjustment nut, thereby detachably retaining the sleeve on the chainsaw when the claw is in the retainer space; the snap-clip mechanism being provided with biasing means for biasing the claw into the retainer space.

2. A bar guard as defined in claim 1, wherein the chainsaw includes at least one saw dog, and the proximal end of the sleeve is flared in the plane of the guide bar for covering at least the distal sharp portion of the saw dog.

3. A bar guard as defined in claim 1, wherein the claw is formed in a clip that is integral with the sleeve and protrudes in a proximal direction from the sleeve.

4. A bar guard as defined in claim 1, wherein the snap-clip mechanism comprises:

(i) a clip mounting bracket permanently attached to the sleeve; and (ii) a clip element pivotally mounted on the clip mounting bracket and fixed to the claw;

and wherein the biasing means is a spring fixed between the clip element and the sleeve.

5. A bar guard as defined in claim 4, additionally including removable fastening means pivotally fastening the the clip element to the mounting bracket, thereby affording replacement of the clip.

6. A bar guard as defined in claim 4, wherein the length of the clip element is selected so that when the sleeve is installed over the guide bar of a selected chainsaw thereby to cover the guide bar, the claw engages the retainer space formed between the two adjustment nuts of the selected guide bar.

7. A bar guard as defined in claim 4, wherein the claw is integral with the clip element.

8. A bar guard as defined in claim 4, wherein the spring is a coil spring mounted between the base of the mounting bracket and the underside of the clip element.

9. A bar guard as defined in claim 8, wherein the coil spring is removable and the base of the mounting bracket and the underside of the clip element are each provided with mounting means for mounting a respective end of the coil spring.

10. A bar guard as defined in claim 9, wherein the base of the mounting bracket and the underside of the clip element are each provided with a circular seat mating with a respective end of the coil spring for mounting the coil spring.

11. A bar guard as defined in claim 1, wherein the clip is cantilevered to the sleeve and flexes upon installation of the sleeve over the guide bar to permit the claw to ride over the distal said adjustment nut and then to establish a latch connection with the distal said adjustment nut.

12. A bar guard as defined in claim 11, wherein the claw is integral with the clip.

13. A bar guard as defined in claim 11, wherein the clip is integral with the sleeve.

14. A bar guard as defined in claim 1, additionally comprising tool holding means fixed to the outer surface of the sleeve.

* * * * *